United States Patent [19]

Klosowski

[11] 3,996,184

[45] Dec. 7, 1976

[54] LOW MODULUS ROOM TEMPERATURE VULCANIZABLE SILICONE ELASTOMER WITH IMPROVED SLUMP CHARACTERISTICS

[75] Inventor: Jerome M. Klosowski, Monitor Township, Bay County, Mich.

[73] Assignee: Dow Corning Corporation, Midland, Mich.

[22] Filed: Dec. 8, 1975

[21] Appl. No.: 638,576

[52] U.S. Cl. .......................... 260/32.6 R; 260/32.4; 260/37 SB; 260/46.5 G
[51] Int. Cl.² .......................................... C08K 5/20
[58] Field of Search ..... 260/32.6 R, 37 SB, 46.5 G, 260/32.4

Primary Examiner—Lewis T. Jacobs
Attorney, Agent, or Firm—Roger H. Borrousch

[57] ABSTRACT

A one package low modulus room temperature vulcanizable silicone elastomer composition is obtained by mixing 100 parts by weight of a hydroxyl endblocked polydimethylsiloxane, 0 to 200 parts by weight of a non-acidic, non-reinforcing filler, 2.5 to 10 parts by weight of

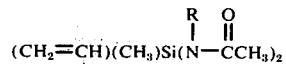

in which R is methyl or phenyl, 1 to 6 parts by weight of an aminoxysilicon compound having 3 to 10 aminoxy groups per molecule, and 1 to 5 parts by weight of N,N-dimethyl-formamide, acetonitrile, or N-n-butylacetamide. The low modulus silicone elastomer is useful in building construction. The composition has improved slump characteristics at low temperatures.

17 Claims, No Drawings

LOW MODULUS ROOM TEMPERATURE VULCANIZABLE SILICONE ELASTOMER WITH IMPROVED SLUMP CHARACTERISTICS

BACKGROUND OF THE INVENTION

1. Field of the Invention

This invention relates to a room temperature vulcanizable silicone elastomer.

2. Description of the Prior Art

Aminoxysilicon compounds are known in the art as shown by U.S. Pat. No. 3,441,583 issued to Robert A. Murphy which is hereby included by reference to show the aminoxysilicon compounds and a method of their preparation. These aminoxysilicon compounds can be used as crosslinkers in silicone elastomer compositions as shown by Boissieras et al. in U.S. Pat. No. 3,359,237 and U.S. Pat. No. 3,429,847. The aminoxysilicon compounds are also known for making low modulus organopolysiloxane elastomers as described by Murphy in U.S. Pat. No. 3,341,486. Murphy describes his low modulus organopolysiloxane elastomers as being a mixture of a silanol-terminated polydiorganosiloxane and a mixture of a difunctional aminoxysilicon compound and a polyfunctional aminoxysilicon compound. Although these low modulus organopolysiloxane elastomers have many useful properties, the compositions are primarily useful as two package products. Additionally, the aminoxy organopolysiloxane compositions are not very storage stable because of scission of the polydiorganosiloxane chain. One method to reduce the chain scission problem is described by Ashby in U.S. Pat. No. 3,592,795 in which aminoxy silyl groups terminate organic polymers. However, by changing the polymer backbone from organosiloxane to organic, the resulting product is no longer a silicone elastomer but it is basically an organic elastomer.

A storage stable room temperature vulcanizable silicon elastomer composition which cured to a low modulus silicone elastomer was described by Toporcer et al. in U.S. Pat. No. 3,817,909 wherein a mixture of a hydroxyl endblocked polydiorganosiloxane having a viscosity of 70 to 50,000 cs. at 25° C., a silane of the formula

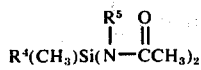

where $R^4$ is methyl, vinyl or phenyl and $R^5$ is methyl, ethyl or phenyl, and an aminoxysilicon compound, optionally containing a non-acidic, non-reinforcing filler was disclosed. Although the compositions described by Toporcer et al. are stable and useful as described, improvements were still sought such as with the freeze-thaw characteristics and slump characteristics.

SUMMARY OF THE INVENTION

It is therefore an object of the present invention to make a storage stable room temperature vulcanizable silicone elastomer composition with improved freeze-thaw and slump characteristics which cures to a low modulus silicone elastomer. This object and others will become apparent from the following detailed description.

This invention relates to storage stable silicone elastomer compositions which cure at room temperature and are obtained by mixing hydroxyl endblocked polydimethylsiloxane, optionally a non-acidic, non-reinforcing filler, a methylvinyldi-(-N-organoacetamido)silane, an aminoxysilicon compound and a polar solvent. These compositions are storage stable if moisture is excluded during preparation and during storage. These compositions have improved toolability, improved slump and cure to low modulus elastomers at room temperature upon exposure to moisture. They find use in building construction because they adhere to most building materials and can expand and contract without rupture.

DESCRIPTION OF THE INVENTION

This invention relates to a composition which is stable under anhydrous conditions but curable at room temperature upon exposure to moisture to a silicone elastomer consisting essentially of a product obtained by mixing (A) 100 parts by weight of a hydroxyl endblocked polydimethylsiloxane having a viscosity at 25° C of from 1 to 100 pascal-second (Pa·s), (B) 0 to 200 parts by weight of a non-acidic, non-reinforcing filler, (C) 2.5 to 10 parts by weight of a silane of the general formula

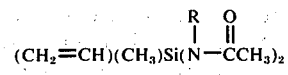

in which R is an organic radical selected from the group consisting of methyl and phenyl, (D) 1 to 6 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —$NR'_2$ and a heterocyclic amine, $R'$ is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, said silane (C) and said aminoxysilicon compound being present in amount sufficient to provide a combined weight of at least 5 parts by weight per 100 parts by weight of (A), and said aminoxysilicon compound, being present in an amount which is not greater than the weight of the silane (C) and (E) 1 to 5 parts by weight of a polar solvent selected from the group consisting of N,N-dimethylformamide, acetonitrile and N-n-butylacetamide.

The hydroxyl endblocked polydimethylsiloxane (A) can have a viscosity at 25° C of from 1 to 100 Pa·s preferably from 15 to 75 Pa·s. These polydimethylsiloxanes can be monodispersed, polydispersed or blends of varying viscosities as long as the average viscosity falls within the limits defined above. For example, a polydimethylsiloxane of 60 Pa·s at 25° C can be a blend of a 2 Pa·s hydroxyl endblocked polydimethylsiloxane fluid and a hydroxyl endblocked polydimethylsiloxane gum having a Williams plasticity of about 1.52 mm. Thus, the viscosity of any individual polymer component of a blend may be outside the viscosity limits, as long as the blend viscosity is within the limits set forth above. Other monovalent hydrocarbon radicals and halogenated monovalent hydrocarbon radicals in small amounts can be present in the polydimethylsiloxane. The term polydimethylsiloxane as used herein does not preclude small amounts of other siloxane units such as monomethylsiloxane units. The hydroxyl endblocked polydimethylsiloxanes are known in the art and can be made by known commercial methods.

The silane, (C), of the general formula

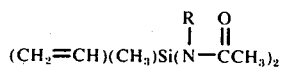

is a key ingredient of the compositions of this invention and provides the low modulus characteristics. In the formula, R represents an organic radical of the group methyl and phenyl. The silanes include, for example, methylvinyldi-(N-methylacetamido)silane and methylvinyldi-(N-phenylacetamido)silane. These amidosilanes can be prepared by reacting a chlorosilane with an alkali metal salt of an appropriate N-organoacetamide. This method is further detailed in U.S. Pat. No. 3,776,933 by Louis H. Toporcer and Irvin D. Crossan, and hereby incorporated by reference for the preparation of the amidosilanes.

The amidosilanes can be prepared, by the following illustration: mixing a sodium salt of N-methylacetamide with methylvinyldichlorosilane in an inert organic solvent such as toluene, filtering the by-produced sodium chloride from the toluene-product solution and thereafter removing the toluene by vacuum distillation to obtain the product, methylvinyldi-(N-methylacetamido)silane.

The aminoxysilicon compounds, (D), can be silicon compounds having from 1 to 100 silicon atoms per molecule in which there are from 3 to 10 aminoxy groups per molecule. The aminoxysilicon compounds can be prepared by the method shown in U.S. Pat. No. 3,441,583 which also illustrates many aminoxysilicon compounds. The aminoxysilicon commmpounds include silanes and siloxanes. The aminoxy group which is bonded to the silicon atoms through silicon-oxygen bonds can be represented by the general formula —OX wherein X is a monovalent amine radical of the group —NR′$_2$ and heterocyclic amine. R′ represents a monovalent hydrocarbon radical. The —NR′$_2$ groups can be represented by N,N-diethylamino, N,N-ethylmethylamino, N,N-dimethylamino, N,N-diisopropylamino, N,N-dipropylamino, N,N-dibutylamino, N,N-dipentylamino, N,N-dihexylamino, N,N-dicyclohexylamino, N,N-methylpropylamino, N,N-methylbutylamino, N,N-diphenylamino, N,N-ditolylamino, N,N-methylphenylamino, and N,N,-methylnaphthylamino. The heterocyclic amines can be illustrated by ethyleneimino, pyrrolidino, piperidino and morpholino.

The aminoxysilicon compounds have 1 to 100 silicon atoms per molecule, 3 to 10 aminoxy groups per molecule and at least one monovalent hydrocarbon radical or halogenated monovalent hydrocarbon radical per silicon atom. Thus, those aminoxysilicon compounds having one silicon atom are silanes having 3 aminoxy groups and one monovalent hydrocarbon radical or halogenated monovalent hydrocarbon radical per molecule. These aminoxy silanes have a general formula R″Si(OX)$_3$ in which R″ can be a monovalent hydrocarbon radical or halogenated monovalent hydrocarbon radical. R″ can be illustrated by methyl, ethyl, phenyl, vinyl, hexyl, octadecyl, cyclohexyl, butyl, heptyl, octyl, benzyl, phenylethyl, naphthyl, propyl, isopropyl, chlorophenyl, 3,3,3-trifluoropropyl, beta-(perfluoropentyl)ethyl, iodonaphthyl, bromoheptyl and the like.

The aminoxysilicon compounds which have more than one silicon atom per molecule can be linear polysiloxanes and cyclic polysiloxanes, for example, either homopolymers or copolymers or mixtures of the siloxanes as well as mixtures of the siloxanes and silanes. The silicon atoms of the siloxanes are linked together through silicon-oxygen-silicon bonds with the remaining valences of the silicon atoms not bonded to aminoxy groups being bonded to monovalent radicals as defined by R″ above. These aminoxysiloxanes can be illustrated by the following compounds and additional illustrations can be found in U.S. Pat. No. 3,441,583, 1,1,3-tri-(N,N-diethylaminoxy)-1,3,3-trimethyldisiloxane,

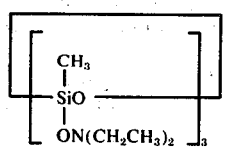

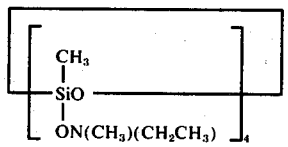

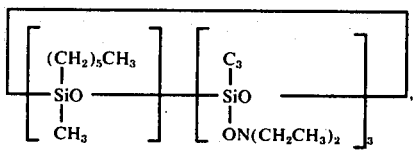

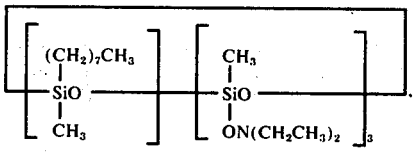

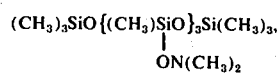

and copolymers consisting of two or more siloxane units of the following illustrative group, CH$_3${(CH$_3$CH$_2$)$_2$NO}SiO, (CH$_3$)$_2$SiO,
(CH$_3$)$_3$SiO$_{0.5}$, {(CH$_3$CH$_2$)$_2$NO}(CH$_3$)$_2$SiO$_{0.5}$,
C$_6$H$_5${(CH$_3$CH$_2$)$_2$NO}SiO, (CH$_2$=CH)(CH$_3$)SiO,
CH$_3$SiO$_{1.5}$, (CF$_3$CH$_2$CH$_2$)(CH$_3$)SiO,
CH$_3${(CH$_3$)$_2$NO}SiO, CH$_3${(C$_6$H$_5$)(CH$_3$)NO}SiO.

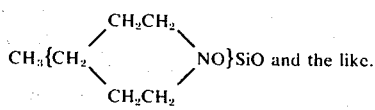

and the like.

The amount of amidosilane, (C), can be from 2.5 to 10 parts by weight per 100 parts by weight of polydimethylsiloxane. The most preferred compositions have from 4 to 8 parts by weight of the amidosilane, (C), per 100 parts by weight of the hydroxyl endblocked polydimethylsiloxane. When the amount of amidosilane is less than 2.5 parts by weight per 100 parts by weight of (A), the resulting composition cures to a silicone elastomer with sufficiently higher modulus so that it would no longer be classified as a low modulus silicone elastomer. The compositions can be packaged with all the reactive ingredients in one package and stored over extended periods of time under anhydrous conditions, such as for three months or more. No advantages are experienced in exceeding 10 parts by weight amidosilane per 100 parts of (A) because slower cures and less desirable physical properties are observed.

The amount of aminoxysilicon compound can be from 1 to 6 parts by weight per 100 parts by weight of hydroxyl endblocked polydimethylsiloxane. The preferred amount of aminoxysilicon compound is dependent to some extent upon the viscosity of the hydroxyl endblocked polydimethylsiloxane. The larger amounts of aminoxysilicon compound are preferably used with the higher viscosity polydimethylsiloxanes. If the amount of aminoxysilicon compound exceeds 6 parts by weight per 100 parts by weight of (A), the resulting cured products are high modulus silicone elastomers. The preferred amount of aminoxysilicon compound is from 2 to 4 parts by weight per 100 parts by weight of (A). However, the amount of aminoxysilicon compound regardless of viscosity should not exceed the weight of the amidosilane (C) and the combined weight of amidosilane (C) and aminoxysilicon compound (D) should be greater than 5 parts by weight per 100 parts by weight of polydimethylsiloxane (A). Amounts of aminoxysilicon compound exceeding the weight of silane (C) result in cured products having high modulus.

The compositions of the present invention are stable upon storage whereas the aminoxy containing compositions defined in U.S. Pat. No. 3,341,486 have problems with chain scission, as discussed in U.S. Pat. No. 3,592,795. The presently defined compositions of this invention have no such storage problems. Although it is not completely understood why the compositions of this invention are storage stable, nevertheless, compositions containing both the amidosilane and the aminoxysilicon compounds in the defined amounts provide storage stable compositions. This storage stability is particularly important for one package compositions.

The compositions of this invention are stored under anhydrous conditions because the amidosilanes and aminoxysilicon compounds are hydrolyzable when contacted by moisture. The compositions of the present invention are also adversely effected by acidic materials and thus the ingredients used in making the compositions of this invention should be neutral or basic to litmus paper when a small amount of the particular ingredient is placed in water.

The compositions of this invention contain from 1 to 5 parts by weight of a polar solvent selected from the group of N,N-dimethylformamide, acetonitrile and N-n-butylacetamide. The preferred solvent is the N,N-dimethylformamide. The compositions described by Toporcer et al. in U.S. Pat. No. 3,817,909 were found to form crystals when cooled below room temperature, such as to 5° C. for example. The crystals appear to be free amide which is formed by trace amounts of moisture and reaction with the silicon-bonded hydroxyl radicals in the composition. It is also observed that there is a relationship between the formation of crystals and the slump properties of the compositions. When crystals were present, the compositions would slump badly at low temperatures. It was found that by using small amounts, 1 to 5 parts by weight, of certain polar solvents this unique low temperature slump problem could be overcome. For a non-slump product, a slump of less than 5 mm in accordance with ASTM-D-2202 is desirable. Other properties could also be improved with the present compositions, such as the toolability of the composition could be improved by using higher viscosity polymers, such as by using a blend of fluid polydimethylsiloxane and gum polydimethylsiloxane. Also, the composition of this invention maintained a better and longer lasting filler dispersion in the composition even at elevated temperatures, such as 70° C. These particular polar solvents do not have detrimental effects on the curing properties of the compositions or on the properties of the cured elastomer.

The compositions of this invention can also contain fillers. The fillers can be present in amounts of from 0 to 200 parts by weight per 100 parts by weight of (A), preferably from 10 to 140 parts by weight filler per 100 parts by weight of (A). These fillers can be any non-acidic, non-reinforcing filler and include for example, calcium carbonate, ferric oxide, non-acidic carbon black, diatomaceous earth, alumina, hydrated alumina, titanium dioxide, glass microballoons, organic fillers, resins, such as silicone resins, crushed quartz, calcium sulfate and the like. Other conventional additives can be used as long as they are neutral or basic, including pigments, dyes, antioxidants, heat stability additives, and the like.

The compositions are preferably made by mixing the hydroxyl endblocked polydimethylsiloxane and filler, if used, to make a homogeneous mixture with the filler well dispersed. A suitable mixture can usually be obtained in one hour using commercial mixers. The resulting mixture is preferably deaired and then a mixture of the amidosilane and aminoxysilicon compound is added and mixed with the polymer and filler mixture. This mixing is done under essentially anhydrous conditions and then the resulting composition is put into containers for storage under essentially anhydrous conditions. Once one package compositions are made, they are stable, that is they do not cure, if the essentially moisture free conditions are maintained, but will cure to low modulus silicone elastomers when exposed to moisture at room temperature. Although the above methods of making the compositions are preferred, the methods of making these compositions are not very critical. The most significant feature is the essentially anhydrous conditions required for mixing and storage wherein either or both the amidosilanes and aminoxysilicon compounds are involved. It is also observed that the best results are obtained, if the aminoxysilicon compound is added to the hydroxyl endblocked polydimethylsiloxane (alone or in a mixture with the filler and/or other additives) either prior to adding the amidosilane or with the amidosilane as a mixture. The polar solvents (E) can be mixed into the composition in any manner and at any time during the preparation, but it has been found convenient to mix the polar solvents with the amidosilane (C) and thus add it at the same time as the amidosilane. Although the present compositions are designed as one package compositions, the components could be packaged in two or more packages, if desired.

The storage stable compositions of this invention comprise a base polymer which consists essentially of a polydimethylsiloxane represented by a general formula $$YO\{(CH_3)_2SiO\}_nY$$

wherein $n$ has a value such that the viscosity at 25° C. of the polydimethylsiloxane moiety, $-O\{(CH_3)_2SiO\}-_n$, from 1 to 100 Pars, Y is a monovalent radical bonded to the polydimethylsiloxane moiety through silicon-oxygen-silicon bonds. The Y radicals are formed when silane (C) and the aminoxysilicon compound are mixed with the hydroxyl endblocked polydimethylsiloxane. The Y radical therefore can be a radical represented by the formula

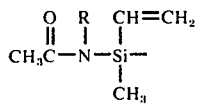

which results from the reaction between silane (C) and the hydroxyl endblocked polydimethylsiloxane wherein an acetamide represented by a general formula

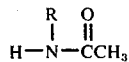

is by-produced. The Y radical can also be a radical residue from an aminoxysilicon compound where an aminoxysilicon compound reacts with a hydroxyl endblocked polydimethylsiloxane by replacing the hydrogen atom of the hydroxyl group with a radical residue from the aminoxysilicon compound illustrated by the reaction scheme as follows:

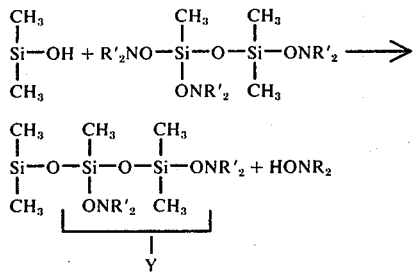

where a Y radical is illustrated in the reaction scheme. As illustrated, a hydroxylamine, HX, is by-produced in this reaction. In view of the presence of both silane (C) and aminoxysilicon compound with hydroxyl endblocked polydimethylsiloxane, the reactions will produce base polymer wherein some Y result from reaction with silane (C) and some Y result from reaction with aminoxysilicon compound. The amounts of each type of Y radical present will depend upon the relative ratios of silane (C) and aminoxysilicon compound present in the composition and the reactivity of the particular species involved. Most compositions will contain a majority of Y radicals from reaction of the hydroxyl endblocked polydimethylsiloxane with the silane (C).

Although the above does not specifically define base polymers wherein two hydroxyl groups react with one molecule of silane (C) or aminoxysilicon compound, this invention is intended to cover such species. The amount of such reaction should be relatively low because the combined total of silane (C) and aminoxysilicon compound present is in excess of the number of molecules necessary to provide an average of one molecule of combination of silane (C) plus aminoxysilicon compound per hydroxyl group and as observed by little viscosity increase of the polymersilane (C)-aminoxysilicon compound mixture over the original polymer viscosity.

The compositions contain amounts of polar solvents of from 1 to 5 parts by weight based on 100 parts by weight polydimethylsiloxane moiety and the amounts of acetamide species and aminoxysilicon compound species are as defined above. The amount of acetamide species include the total amount of silane (C), by-produced acetamide and the Y radicals which have the formula

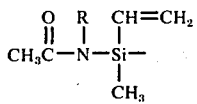

which total amount is from 2.5 to 10 parts by weight based on 100 parts of the polydimethylsiloxane moiety. The amount of aminoxy species include the total amount of aminoxysilicon compound, by-produced hydroxylamine which is defined by the formula HX and the Y radicals which are aminoxysilicon compound residues which total amount is from 1 to 6 parts by weight based on 100 parts by weight of the polydimethylsiloxane moiety.

The compositions can contain non-acidic, non-reinforcing filler in amounts up to 200 parts by weight based on 100 parts by weight of polydimethylsiloxane moiety.

The compositions of this invention when cured provide elastomers with high elongation, such as greater than 600% and values of 1,000 to 1,800% are not unusual with a modulus at 150% elongation of less than 0.7 megapascal (MPa). These low modulus silicone elastomers find utility in building construction, such as in sealing joints wherein the building materials sealed by these materials can expand and contract without breaking the seal. Another outstanding feature of the cured low modulus silicone elastomers of this invention is that the tear is of a "knotty tear". A knotty tear refers to the type of tear propagation. The propagation in materials with a knotty tear will progress at sharp angles and thus instead of tearing along the entire length of a sealed joint the tear will progress across the width, for example, instead of the length of the joint. The low modulus silicone elastomers of this invention also have unprimed adhesion to a broad spectrum of building materials. The compositions of this invention also have a rapid skin-over time which helps to keep the sealing material clean because it skins over rapidly, and dirt, which would ordinarily adhere to a tacky surface, if several hours lapse before skin over, is avoided.

The compositions of this invention also do not show chain scission of the polydiorganosiloxane as is a problem with aminoxy silicone systems of the prior art and are thus much more storage stable. The compositions of this invention are extrudable from containers directly to their use area.

The compositions of the present invention do not require a catalyst to aid in curing the compositions and it is observed that many of the conventional curing catalysts used in room temperature vulcanizable silicone elastomer compositions are detrimental to the curing of the compositions.

The following examples are presented for illustrative purposes only and should not be construed as limiting the invention which is delineated in the claims. All parts are parts by weight unless otherwise specified.

the results in MPa, percent extension and MPa respectively. The tear strength, Die "B", was determined by ASTM-D-624 with the results in newton/meter (N/m). The skin-over time was determined by observing the time lapsed between the deposition of the composition with exposure to ambient moisture and the point at which the surface was dry to a light tough with a finger.

B. A composition was prepared and tested as described in A. above except the polymer blend had a viscosity at 25° C of 0.052 m²/s.

C. A composition was prepared and tested as described in A. above except the polymer blend had a viscosity at 25° C of 0.062 m²/s.

D. A composition was prepared and tested as described in A. above except the polymer blend had a viscosity at 25° C of 0.072 m²/s.

Table I

| Composition | Extrusion rate gms/min. | Durometer, Shore A | Tensile Strength at break MPa | Elongation at break, percent | 150% modulus, MPa | Tear Strength, Die "B" N/m | Skin over time, minutes | Slump, mm |
| --- | --- | --- | --- | --- | --- | --- | --- | --- |
| A | 138.5 | 15 | 0.90 | 1650 | 0.21 | 4200 | 8 | 0.28 |
| B | 132 | 13 | 0.83 | 1600 | 0.21 | 4400 | 8 | 0.28 |
| C | 125.3 | 8 | 0.55 | 1750 | 0.10 | 3300 | 8 | 0.28 |
| D | 72 | 14 | 0.83 | 1700 | 0.21 | 4600 | 8 | 0.20 |

EXAMPLE 1

A. A hydroxyl endblocked polydimethylsiloxane which was a blend of a hydroxyl endblocked polydimethylsiloxane fluid having a viscosity at 25° C of about 12.5 Pa·s and a hydroxyl endblocked polydimethylsiloxane gum having a Williams plasticity in the range of 1.40 to 1.50 mm and which had a viscosity at 25° C of 0.045 square meters per second (m²/s) as determined on a Brookfield viscometer with a No. 5 spindle at 5 rpm was mixed with calcium carbonate filler to provide a well dispersed mixture of 120 parts of hydroxyl endblocked polydimethylsiloxane and 145 parts of calcium carbonate. To 200 parts of the above polymer-filler mixture, 5 parts of methylvinyldi-(N-methylacetamido)silane, 3 parts of an aminoxysiloxane copolymer having 20 mol percent trimethylsiloxy units, 30 mol percent dimethylsiloxane units and 50 mol percent of siloxane units of the formula

and 2 parts of N,N-dimethylformamide was mixed with the polymer-filler mixture under essentially anhydrous conditions. The resulting mixture was then packaged in sealed containers and the physical properties as shown in Table I were obtained. The properties were determined as follows, wherein the properties of the cured elastomers were determined on samples cured for seven days under ambient conditions. The extrusion rate was determined by Military Specification Mil-S-7502 with the results in grams per minute (gms./min.). The slump was determined by ASTM-D-2202 with the results in millimeters (mm). The durometer was determined by ASTM-D-2240-64T on the Shore A scale. The tensile strength at break, elongation at break and 150% modulus were determined by ASTM-D-412 with

EXAMPLE 2

A polymer blend of 100 parts of a hydroxyl endblocked polydimethylsiloxane fluid having a viscosity at 25° C of about 12.5 Pa·s and 20 parts of a hydroxyl endblocked polydimethylsiloxane gum having a Williams plasticity in the range of 1.40 to 1.50 mm was mixed with 120 parts of calcium carbonate filler. This mixture was used as a base material from which curable compositions were prepared by mixing under essentially anhydrous conditions.

A.
  200 parts base material
  4 parts methylvinyldi-(N-methylacetamido)silane, and
  3 parts aminoxysiloxane copolymer as defined in Example 1.

B.
  200 parts base material
  3.64 parts methylvinyldi-(N-methylacetamido)silane,
  0.36 parts N-methylacetamide,
  4.00 parts N,N-dimethylformamide, and
  3 parts aminoxysiloxane copolymer as defined in Example 1.

C.
  200 parts base material,
  3.56 parts methylvinyldi-(N-methylacetamido)silane,
  0.36 part N-methylacetamide,
  2.08 parts N,N-dimethylformamide, and
  3 parts aminoxysiloxane copolymer as defined in Example 1.

The three curable compositions were stored at −15° C and composition A. formed crystals and slumped whereas compositions B. and C. did not form crystals and did not slump. This showed that by adding free N-methylacetamide to the composition, the crystal formation could be prevented by using N,N-dimethylformamide. The adhesion of these three compositions were determined by curing each of the compositions on aluminum, concrete and glass. In each case, the cured elastomer had 100 percent cohesive failure. This showed that the presence of the N,N-dimethylformamide did not adversely effect the adhesion properties.

EXAMPLE 3

Base materials were prepared as described in Example 1 using 100 parts of the fluid and amounts of gum and calcium carbonate filler as defined in Table II. The fluid and gum were the same as described in Example 1. To 200 parts of the base material, 4 parts methylvinyldi-(N-methylacetamido)silane and 3 parts aminoxysiloxane copolymer as defined in Example 1 were mixed with the base material and as shown in Table II an amount of N,N-dimethylformamide (DMF) was used in certain compositions. The slump was determined on each composition in accordance with the procedure of ASTM-D-2202 and the results were obtained in mm. The slump for the compositions was determined after storage at room temperature and after the hours shown at −15° C. Table II shows that the presence of the N,N-dimethylformamide improved the slump after storage at low temperature.

A second base material was prepared as described above, except 15 parts gum was used instead of 20 parts.

A composition C. was prepared by mixing 200 parts of this second base material with the same ingredients and amounts as defined for composition A.

A composition D. was prepared by mixing 200 parts of this second base material with the same ingredients and amounts as defined for composition B.

The properties were determined as defined in Example 1 and were shown in Table III. None of the compositions formed crystals.

Table III

| Composition | Durometer, Shore A | Tensile Strength at break MPa | Elongation at break, percent | 150% modulus, MPa | Tear Strength, Die "B" N/m |
|---|---|---|---|---|---|
| A. | 17 | 0.72 | 1700 | 0.22 | 5100 |
| B. | 14 | 0.72 | 1620 | — | 5400 |
| C. | 16 | 0.79 | 1600 | 0.26 | 5600 |
| D. | 15 | 0.77 | 1550 | 0.25 | 5200 |

EXAMPLE 5

Slump was determined as defined in Example 1 on five compositions after specified exposures to the following defined conditions.

a. Room temperature (RT)
b. −15° C.
c. Exposure A = one week at room temperature
Exposure B = one week at room temperature plus one week at −15° C.
Exposure C = one week at room temperature plus Table II

| Composition | Gum, parts | CaCO₃ parts | DMF parts | Room Temperature Slump, mm After 16 hours | Slump in mm After Storage at −15° C for | | | |
|---|---|---|---|---|---|---|---|---|
| | | | | | 16–20 hours | 36 hours | 96 hours | 530 hours |
| A | 20 | 120 | 0 | 0.76 | 3.30 | 1.52 | 12.7 | 10.2 |
| B | 20 | 120 | 4 | 0.51 | 0.25 | 1.78 | 2.03 | 0.00 |
| C | 20 | 120 | 2 | 1.27 | 1.27 | 1.27 | 0.76 | 0.00 |
| D | 20 | 150 | 0 | 0.51 | 0.00 | 0.00 | 1.78 | 0.00 |
| E | 20 | 150 | 4 | 0.51 | 0.00 | 0.00 | 0.00 | 0.00 |
| F | 20 | 150 | 2 | 0.00 | 0.00 | 0.00 | 0.00 | 0.00 |
| G | 20 | 145 | 0 | 1.27 | 0.51 | 0.76 | 0.76 | 1.27 |
| H | 20 | 145 | 4 | 1.27 | — | — | 0.76 | 0.00 |
| I | 20 | 145 | 2 | 0.51 | 0.25 | 0.51 | 0.76 | 0.00 |
| J | 15 | 145 | 0 | 1.27 | 5.08 | 5.08 | 5.59 | 2.54 |
| K | 15 | 145 | 4 | 1.27 | 2.54 | 2.54 | 2.54 | 0.00 |
| L | 15 | 145 | 2 | 0.51 | 2.29 | 2.29 | 2.29 | 0.00 |
| M | 15 | 150 | 0 | 2.03 | 1.52 | 1.52 | 2.54 | 12.7 |
| N | 15 | 150 | 4 | 2.03 | 1.52 | 1.52 | 0.25 | 0.00 |
| O | 15 | 150 | 2 | 2.03 | 1.02 | 1.02 | 0.76 | 0.00 |

EXAMPLE 4

A base material was prepared as described in Example 1 using 94 parts of the fluid, 20 parts of the gum, 6 parts of a hydroxyl endblocked polydimethylsiloxane fluid having a viscosity at 25° C of about 4 Pa·s and 145 parts of calcium carbonate filler.

A composition A. was prepared by mixing 200 parts of the base material with 4 parts methylvinyldi-(N-methylacetamido)silane, 4 parts, N,N-dimethylformamide and 3 parts aminoxysiloxane copolymer as defined in Example 1.

A composition B. was prepared by mixing 200 parts of the base material with 4 parts methylvinyldi-(N-methylacetamido)silane, 2 parts N,N-dimethylformamide and 3 parts aminoxysiloxane copolymer as defined in Example 1.

one week at −15° C. plus one week at 70° C.
Exposure D = one week at room temperature plus one week at −15° C. plus one week at 70° C. plus one week at room temperature
Exposure E = one week at room temperature plus one week at −15° C. plus one week at 70° C. plus one week at room temperature plus one week at −15° C.
Exposure F = one week at room temperature plus one week at −15° C. plus one week at 70° C. plus one week at room temperature plus one week at −15° C. plus 1 week at 70° C.

The compositions were as follows: Composition 1 was the same as defined in Table III, Composition A; Composition 2 was the same as defined in Table III, Composition H; Composition 3 was the same as defined in Table III, Composition I; Composition 4 was the same as defined in Table III, Composition K; and Composition 5 was the same as defined in Table III, Composition L. The results of the slump determinations were as shown in Table IV.

Table IV

| Composition | Slump mm | | | | |
|---|---|---|---|---|---|
| | 1 | 2 | 3 | 4 | 5 |
| Exposure | | | | | |
| 1 week at RT | 2.29 | 2.03 | 1.27 | 1.27 | 1.27 |
| 2 week at RT | 3.05 | 1.27 | 1.79 | 1.27 | 1.27 |
| 3 week at RT | 5.08 | 2.54 | 1.79 | 1.27 | 0.51 |
| 4 week at RT | 5.08 | 1.79 | 1.02 | 0.76 | 0.51 |
| 5 week at RT | 5.08 | 1.79 | 1.52 | 1.02 | 0.76 |
| 6 week at RT | 4.32 | 2.03 | 1.79 | 1.79 | 1.25 |
| 1 week at −15° C. | 2.54 | 0.51 | 1.79 | 0.51 | 2.29 |
| 2 week at −15° C. | 2.79 | 2.29 | 1.27 | 1.27 | 1.27 |
| 3 week at −15° C. | 2.79 | 0.51 | 1.27 | 1.27 | 1.79 |
| 4 week at −15° C. | 5.08 | 0.76 | 0.51 | 0.51 | 1.79 |
| 5 week at −15° C. | 5.33 | 0.76 | 1.02 | 1.02 | 2.03 |
| 6 week at −15° C. | 3.05 | 1.27 | 1.27 | 1.27 | 2.03 |
| Exposure A | 2.79 | 1.02 | 1.27 | 0.76 | 2.03 |
| Exposure B | 3.05 | 1.27 | 0.76 | 0.76 | 0.00 |
| Exposure C | 7.62 | 2.03 | 1.27 | 1.52 | 1.27 |
| Exposure D | 5.08 | 0.76 | 2.03 | 0.51 | 1.79 |
| Exposure E | 3.05 | 0.76 | 0.76 | 1.27 | 0.00 |
| Exposure F | 7.62 | 2.54 | 2.03 | 2.54 | 2.54 |

EXAMPLE 6

A base material was prepared as described for Example 3, Composition G. To 200 parts of base material, the described amounts in Table V of methylvinyldi-(N-methylacetamido)silane, (silane) N,N-dimethylformamide, (DMF) and aminoxysiloxane copolymer as described in Example 1 were added. The physical properties were determined as described in Example 1 and the results were as shown in Table V. No crystals or separation were observed in any of these compositions on storage under essentially anhydrous conditions. Adhesion comments were based on the combined results for concrete, glass, and aluminum where the better results were those with the highest amount of cohesive failure.

Table V

| Composition | Silane, parts | DMF, parts | Aminoxy-siloxane, parts | Durometer, Shore A | Tensile Strength at break MPa | Elongation, at break percent | Tear Strength, Die "B", N/m |
|---|---|---|---|---|---|---|---|
| 1 | 3 | & 0.83 | 3 | 17 | 1.19 | 1580 | 3700 |
| 2 | 5 | 2 | 2 | 7 | 0.29 | 2300 | 2100 |
| 3 | 5 | 2 | 1 | 15 | 0.81 | 1680 | 4200 |
| 4 | 5 | 2 | 3 | 14 | 0.84 | 1700 | 4000 |
| 5 | 4 | 1.6 | 3 | 11 | 0.66 | 1800 | 4000 |

| Composition | Extrusion rate, g/min. | 150% modulus MPa | Adhesion | Skin over time, min. | Slump, at −15° C. mm |
|---|---|---|---|---|---|
| 1 | & 14.2 | 0.23 | poor | 15 | 7.62 |
| 2 | 106 | 0.10 | fair | 20 | 2.54 |
| 3 | 88 | 0.21 | good | 20 | 2.29 |
| 4 | 107 | 0.19 | good | 15 | 2.29 |
| 5 | 129 | 0.16 | good | 15 | 2.54 |

EXAMPLE 7

Six base materials were prepared as described in Example 1. To 200 parts of each base material, 4 parts of methylvinyldi-(N-methylacetamido)silane, 3 parts of aminoxysiloxane copolymer as defined in Example 1 and 2 parts of N,N-dimethylformamide were mixed into the base materials under essentially anhydrous conditions. The base materials were:

A. 50 parts of polydimethylsiloxane blend having a viscosity of 0.045 m²/s at 25° C and 50 parts of calcium carbonate
B. 40 parts of polydimethylsiloxane blend having a viscosity of 0.045 m²/s at 25° C and 60 parts of calcium carbonate
C. 35 parts of polydimethylsiloxane blend having a viscosity of 0.045 m²/s at 25° C and 65 parts of calcium carbonate
D. 50 parts of polydimethylsiloxane blend having a viscosity of 0.062 m²/s at 25° C and 50 parts of calcium carbonate
E. 40 parts of polydimethylsiloxane blend having a viscosity of 0.062 m²/s at 25° C and 60 parts of calcium carbonate
F. 35 parts of polydimethylsiloxane blend having a viscosity of 0.062 m²/s at 25° C and 65 parts of calcium carbonate The skin over time, extrusion rate and slump were determined as defined in Example 1. The results were as shown in Table VI.

Table VI

| Base Material | Extrusion rate, g/min. | Slump at room temperature, mm | Skin over Time, min. |
|---|---|---|---|
| A | 160 | 2.79 | 10 |
| B | 126 | 2.29 | 10 |
| C | 139 | 1.27 | 10 |
| D | 158 | 1.79 | 10 |
| E | 113.3 | 0.00 | 10 |
| F | 134 | 0.00 | 10 |

EXAMPLE 8

When acetonitrile or N-n-butylacetamide are used in place of N,N-dimethylformamide in Example 1, equivalent results are obtained.

That which is claimed is:

1. A composition which is stable under anhydrous conditions but curable at room temperature upon exposure to moisture to a silicone elastomer consisting essentially of a product obtained by mixing
   A. 100 parts by weight of a hydroxyl endblocked polydimethylsiloxane having a viscosity at 25° C of from 1 to 100 Pa·s,
   B. 0 to 200 parts by weight of a non-acidic, non-reinforcing filler,
   C. 2.5 to 10 parts by weight of a silane of the general formula

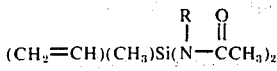

in which R is an organic radical selected from the group consisting of methyl and phenyl, D. 1 to 6 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR′$_2$ and a heterocyclic amine, R′ is a monovalent hydrocarbon radical, —OX -OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, said silane (C) and said aminoxysilicon compound being present in amounts sufficient to provide a combined weight of at least 5 parts by weight per 100 parts by weight of (A), and said aminoxysilicon compound being present in an amount which is not greater than the weight of the silane (C) and E. 1 to 5 parts by weight of a polar solvent selected from the group consisting of N,N-dimethylformamide, acetonitrile and N-n-butylacetamide.

2. The composition in accordance with claim 1 in which R is methyl and each R′ is ethyl.

3. The composition in accordance with claim 2 in which the non-acidic, non-reinforcing filler is present in an amount of from 10 to 140 parts by weight.

4. The composition in accordance with claim 3 in which the viscosity of the polydimethylsiloxane is from 15 to 75 Pa·s at 25° C.

5. The composition in accordance with claim 4 in which the silane (C) is present in an amount of from 4 to 8 inclusive parts by weight.

6. The composition in accordance with claim 5 in which the non-acidic, non-reinforcing filler is calcium carbonate.

7. The composition in accordance with claim 6 in which the aminoxysilicon compound is a linear copolymer having an average of 5 to 15 silicon atoms per molecule and having siloxane units selected from the group consisting of trimethylsiloxane units, dimethyl-(N,N-diethylaminoxy)siloxane units, methyl-(N,N-diethylaminoxy)siloxane units and dimethylsiloxane units.

8. The composition in accordance with claim 7 in which (E) is N,N-dimethylformamide.

9. The composition in accordance with claim 1 in which the polydimethylsiloxane (A) is a blend of polydimethylsiloxanes of various viscosities.

10. The composition in accordance with claim 9 in which the blend contains at least some hydroxyl endblocked polydimethylsiloxane gum having a viscosity greater than 1000 Pa·s at 25° C.

11. A method of preparing a composition which is storable under essentially anhydrous conditions but cures to an elastomer upon exposure to moisture comprising I. mixing to obtain a homogeneous mixture,
A. 100 parts by weight of a hydroxyl endblocked polydimethylsiloxane having a viscosity at 25° C of from 1 to 100 Pa·s and
B. 0 to 200 parts by weight of a non-acidic, non-reinforcing filler, thereafter, II. mixing thoroughly with the homogeneous mixture obtained from (I) under essentially anhydrous conditions
C. 2.5 to 10 parts by weight of a silane of the general formula

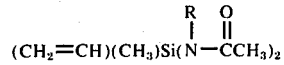

in which R is an organic radical selected from the group consisting of methyl and phenyl, D. 1 to 6 parts by weight of an aminoxysilicon compound having from 1 to 100 silicon atoms per molecule and from 3 to 10 aminoxy groups per molecule, said aminoxy group having a general formula —OX in which X is a monovalent amine radical selected from the group consisting of —NR′$_2$ and a heterocyclic amine, R′ is a monovalent hydrocarbon radical, the —OX group being bonded to silicon atoms through an Si'O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, said silane (C) and said aminoxysilicon compound being present in amounts sufficient to provide a combined weight of at least 5 parts by weight per 100 parts by weight of (A), and said aminoxysilicon compound being present in an amount which is not greater than the weight of the silane (C) and E. 1 to 5 parts by weight of a polar solvent selected from the group consisting of N,N-dimethylformamide, acetonitrile and N-n-butylacetamide, III. placing the resulting composition obtained in (II) in a storage container which essentially excludes moisture from contacting this composition and maintains this composition under an essentially anhydrous condition.

12. The method in accordance with claim 11 in which the silane (C) and the polar solvent (E) are combined before mixing with the homogeneous mixture and the aminoxysilicon compound (D) is mixed with the homogeneous mixture before the combination of (C) and (E) is added.

13. The method in accordance with claim 11 in which a mixture of (C), (D) and (E) is added to the homogeneous mixture.

14. The method in accordance with claim 11 in which the resulting composition is exposed to moisture by removing it from the storage container.

15. An elastomer obtained after the exposed composition defined by claim 14 cures.

16. A composition which is storage stable under essentially anhydrous conditions but curable to an elastomer upon exposure to moisture comprising a base polymer consisting essentially of a polydimethylsiloxane represented by a general formula YO{(CH$_3$)$_2$SiO}$_n$Y wherein $n$ has a value such that the viscosity at 25° C of the polydimethylsiloxane moiety is from 1 to 100 Pa·s where each Y is a monovalent radical selected from the group consisting of

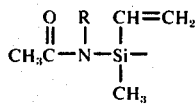

and the residue of an aminoxysilicon compound wherein one aminoxy group is replaced by a silicon-oxygen-silicon bond to the polydimethylsiloxane segment —O{(CH$_3$)$_2$SiO}$_n$ where the aminoxysilicon compound has from 1 to 100 silicon atoms per molecule and from 3 to 10 aminoxy groups per molecule, said aminoxy group having a general formula —OX in which X is a monovalent amine radical selected from the group consisting of —NR'$_2$ and a heterocyclic amine, R' is a monovalent hydrocarbon radical, the —OX group being bonded to silicon atoms through an Si—O bond, the remaining valences of the silicon atoms in the aminoxysilicon compound being satisfied by divalent oxygen atoms which link the silicon atoms of the aminoxysilicon compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, and from 1 to 5 parts by weight of a polar solvent selected from the group consisting of N,N-dimethylformamide, acetonitrile and N-n-butylacetamide based on 100 parts by weight of polydimethylsiloxane moiety, wherein a combined amount of acetamide species of a silane represented by the general formula

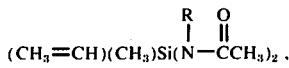

the monovalent Y radicals which are

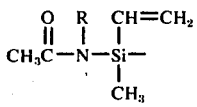

and by-produced acetamide represented by the general formula

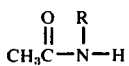

are present in an amount of from 2.5 to 10 parts by weight based on 100 parts by weight of polydimethylsiloxane moiety, and wherein a combined amount of aminoxy species of an aminoxysilicon compound as defined above, the monovalent Y radicals which are residues of an aminoxysilicon compound and HX where X is defined above are present in an amount of from 1 to 6 parts by weight based on 100 parts by weight of polydimethylsiloxane moiety, said acetamide species and said aminoxy species being present in amounts sufficient to provide a combined weight of at least 5 parts by weight per 100 parts by weight of polydimethylsiloxane moiety and said aminoxy species being present in an amount which is not greater than the weight of the acetamide species.

17. The composition according to claim 16 which also contains up to 200 parts by weight of a non-acidic, non-reinforcing filler based on 100 parts by weight of polydimethylsiloxane moiety.

* * * * *

UNITED STATES PATENT AND TRADEMARK OFFICE
CERTIFICATE OF CORRECTION

PATENT NO. : 3,996,184
DATED : December 7, 1976
INVENTOR(S) : Jerome M. Klosowski It is certified that error appears in the above-identified patent and that said Letters Patent are hereby corrected as shown below:

In Column 1, line 39; the line reading "con elastomer composition which cured to a low modu-" should read "cone elastomer composition which cured to a low modu-"

In Column 2, line 51; the line reading "pound being present in amount sufficient to provide a" should read "pound being present in amounts sufficient to provide a"

In Column 4, line 45; the formula reading

" 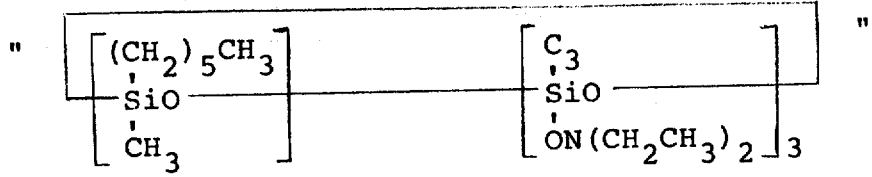 "

should read " 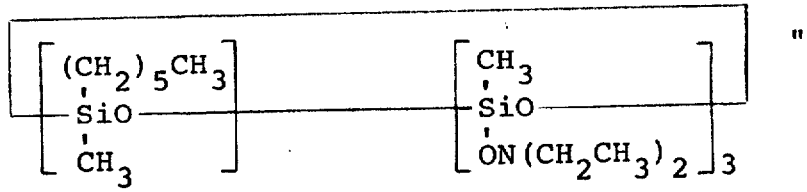 "

UNITED STATES PATENT AND TRADEMARK OFFICE
CERTIFICATE OF CORRECTION

PATENT NO. : 3,996,184                        Page 2 of 3
DATED      : December 7, 1976
INVENTOR(S): Jerome M. Klosowski It is certified that error appears in the above-identified patent and that said Letters Patent are hereby corrected as shown below:

In Column 7, line 19; the line reading "O}-$_n$, from 1 to 100 Pars, Y is a monovalent radical" should read "O}-$_n$, from 1 to 100 Pa·s, Y is a monovalent radical"

In Column 13, line 45; under the column heading "DMF, parts & 0.83" should read "DMF, parts 0.83"

In Column 13, line 54; under the column heading "Extrusion rate. g/min. & 14.2 " should read "Extrusion rate. g/min. 14.2 "

UNITED STATES PATENT AND TRADEMARK OFFICE
CERTIFICATE OF CORRECTION

PATENT NO. : 3,996,184

DATED : December 7, 1976

INVENTOR(S) : Jerome M. Klosowski

It is certified that error appears in the above-identified patent and that said Letters Patent are hereby corrected as shown below:

In Column 15, line 15; the line reading "bon radical, -OX -OX group being bonded to" should read "bon radical, -OX group being bonded to"

In Column 16, line 28; the line reading "being bonded to silicon atoms through an Si'O" should read "being bonded to silicon atoms through an Si-O"

Signed and Sealed this

Fifth Day of January 1982

[SEAL]

Attest:

Attesting Officer

GERALD J. MOSSINGHOFF

Commissioner of Patents and Trademarks